H. VAN DE WATER.
Churn.

No. 224,059. Patented Feb. 3, 1880.

Witnesses:
J. B. Holderly
F. D. Thomason

Inventor:
Henry Van De Water
By R. S. & A. P. Lacey
Atty's

UNITED STATES PATENT OFFICE.

HENRY VAN DE WATER, OF AUBURN, NEW YORK.

CHURN.

SPECIFICATION forming part of Letters Patent No. 224,059, dated February 3, 1880.

Application filed June 14, 1879.

*To all whom it may concern:*

Be it known that I, HENRY VAN DE WATER, of Auburn, in the county of Cayuga and State of New York, have invented certain new and useful Improvements in Churns; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

This invention has reference to the manner of constructing the churn-box and paddles, all of which will be hereinafter fully explained, and pointed out in the claim.

Figure 1:
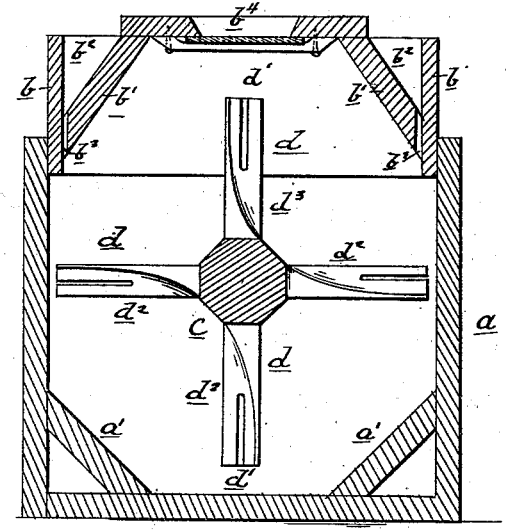
Figure 2:
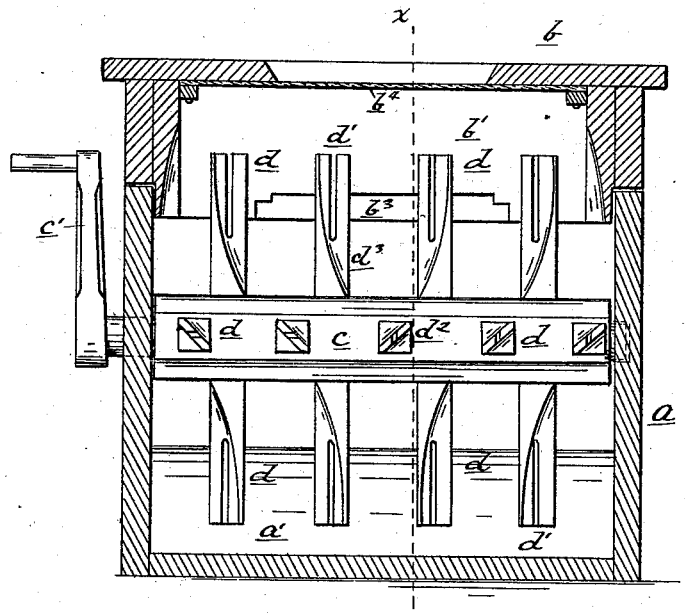

In the drawings, Figure 1 is a vertical cross-section. Fig. 2 is a vertical longitudinal section of a churn constructed according to my invention.

The churn-box is composed of the rectangular body $a$, open at top, and the cap or cover $b$, the latter being constructed to fit snugly within the open side of the former.

Within the lower corners, and lengthwise of the body $a$, I place the angle-strips $a'$ $a'$, and within the corresponding corner of the cover I put the angle-strips $b'$ $b'$. These angle-strips are so constructed and arranged that when put in place they make a longitudinal octagonal chamber within the churn. These angle-strips are snugly fitted to the sides, bottom, and top of the churn, so that no leakage can take place between them and the churn-box.

A churn-box of octagon form, as above described, gives better results than any of the ordinary forms. I employ a dasher having four rows of paddles arranged at right angles to each other, and these throw the milk against the straight side, from which it falls back between the two rows of paddles, to be again violently thrown against the next side one-eighth of a revolution farther on. The angle-strips also give greater strength and durability to the box, preventing the latter from springing or otherwise becoming unserviceable.

On the outer sides of the cap $b$ I form the funnel-shaped spouts $b^2$ $b^2$, from the lower ends of which I cut the small vertical openings $b^3$ $b^3$, leading into the churn between the lower ends of the angle-plates $b'$ $b'$ and the sides of the cap. Through these openings $b^3$ $b^3$ water may be poured into the churn without difficulty, and without splattering over the sides and top of the box.

The openings $b^3$ also serve to let off the gas generated by the rapid agitation of the milk, and their vertical position at the side of the cap prevents the milk from splashing through them.

If, when the dasher is violently turned, any portion of milk should be forced upward through the openings $b^3$, it will be prevented from running out over the sides of the churn by the funnel-spouts $b^2$ $b^2$. Thus it will be seen that the churn will be kept clean, and at the same time the aeration of the milk is secured.

In a suitable opening in the top I insert a glass plate, $b^4$, through which the progress of the churning may be seen.

$c$ is the dasher-shaft, which extends centrally through the octagonal chamber, and is journaled in the ends of the body $a$, and is provided with a crank, $c'$, by which it is revolved.

$d$ are the paddles, having their inner ends made rectangular and affixed to the shaft $c$, so that their sides toward the ends of said shaft will be parallel with the line of motion of the dasher. The paddles are flattened and made thin at their outer ends and gradually increase in thickness toward the shaft $c$. The paddles are flattened by cutting on a curved line, starting at a given corner on the end next the shaft and terminating at the outer ends and at the opposite corner, as is shown more clearly in Fig. 1. Both sides of the paddle being cut away in this manner gives a thin flat outer end, which sits at an angle of forty-five degrees to the line of revolution, and also gives a curved face to the paddle, which causes the milk to be thrown outward from the center, or from the axis $c$, against the sides of the box.

Each paddle has formed in its outer end the longitudinal slot $d'$, extending inward about half-way to the axis $c$. This slot increases the agitation of the milk, for portions of the latter will pass through the slot, and, being forcibly united with the portions behind, the whole is given a rolling motion as it is thrown farther outward toward the sides of the box.

The paddles are arranged in four rows along the axis $c$. The paddles of one row are placed alternately, as shown, so that the line of motion of any given paddle is between the lines of two paddles in the next preceding row. The curved faces of the paddles are peculiarly arranged. In any given row the faces of one side face the middle and the faces in their opposite side face toward the outer ends of the axis $c$. In the next following row of paddles the faces are arranged opposite, or so as to oppose or counteract the action of the preceding paddle, as is shown by the position of the paddles marked $d^2$ $d^3$. This alternating or opposing position of the paddles throws the milk laterally, first in one direction and then in the other direction, thus increasing the agitation of the milk, the particles of which, by the time they have reached the ends of the paddles, are moving or rolling in opposition to each other, which movement soon bursts the globules and releases the butter.

The paddle $d$, constructed with curved faces and the slot $d'$, even when the series of rows is arranged all in the same manner, will give to milk an outward and lateral throw, and will mix thoroughly and soon break it; but when arranged as hereinbefore described the breaking will be accomplished in a much shorter time.

What I claim as my invention, is—

The combination, with the churn-box, constructed with an octagonal milk-chamber, and having the funnels $b^2$ and openings $b^3$, of the series of paddles $d$ provided with slots $d'$, and curved faces, formed in the manner described and arranged in rows on the axis $c$, the paddles of one row being arranged in alternating positions with the paddles of the next, and the curved faces being arranged so that they act in opposition, substantially as and for the purposes set forth.

In testimony that I claim the foregoing as my own I affix my signature in presence of two witnesses.

HENRY VAN DE WATER.

Witnesses:
JOHN ROSECRANS,
M. S. MYERS.